United States Patent [19]

Ivey

[11] 4,279,058
[45] Jul. 21, 1981

[54] PROCESS FOR REMOVING MEAT FROM BONES

[75] Inventor: Francis J. Ivey, Chesapeake, Va.

[73] Assignee: International Telephone and Telegraph Corporation, New York, N.Y.

[21] Appl. No.: 63,287

[22] Filed: Aug. 2, 1979

[51] Int. Cl.³ .............................................. A22C 17/00
[52] U.S. Cl. ......................................................... 17/46
[58] Field of Search .................................. 17/46, 1 G

[56] References Cited

U.S. PATENT DOCUMENTS

| 3,017,661 | 1/1962 | Zartman | 17/46 |
| 3,594,190 | 7/1971 | Eslinger | 17/46 X |

FOREIGN PATENT DOCUMENTS

| 1207111 | 9/1970 | United Kingdom | 17/46 |
| 441909 | 12/1974 | U.S.S.R. | 17/46 |

Primary Examiner—Willie G. Abercrombie

Attorney, Agent, or Firm—John T. O'Halloran; Alfred C. Hill

[57] ABSTRACT

The process for removing residual meat from whole raw bones from which the major portion of the meat has already been removed comprises the steps of tumbling a new batch of bones in a brine solution used in processing a previous batch of bones for a predetermined period of time and below the temperature at which the residual meat is cooked to abrade the residual meat from the new batch of bones to form a raw meat slurry, removing the slurry produced as an end product of the process, tumbling the previously tumbled bones in a fresh brine solution for a predetermined period of time and below that temperature at which the residual meat is cooked to abrade any remaining portion of the residual meat from the previously tumbled batch of bones, removing cleaned bones from the tumbled fresh brine solution, replacing the removed cleaned bones with a fresh batch of bones, and repeating the above process steps.

16 Claims, 2 Drawing Figures

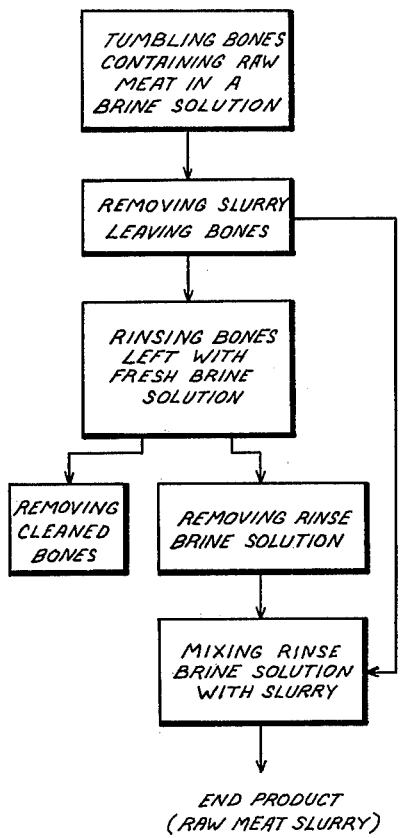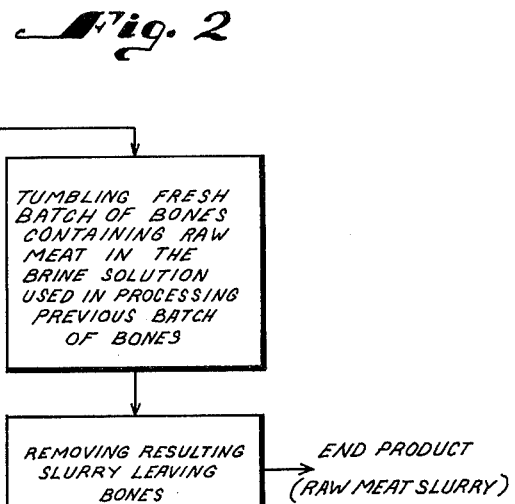
Fig. 1 (PRIOR ART)
Fig. 2

PROCESS FOR REMOVING MEAT FROM BONES

BACKGROUND OF THE INVENTION

In the normal course of packinghouse operations, a large quantity and variety of meat must be "boned out". Thus, in order to produce a boneless ham, a butcher must first remove the bone from the hind leg of the hog. This is done with a simple knife, and when skillfully performed, only a relatively small amount of meat remains on the bone. In other cases, particularly when removing the back bones and neck bones of cattle and hogs, the bones contain substantial amounts of meat, since it is not feasible to follow the irregular surface of each vertebrae with a simple knife. These bones are often trimmed further using a motorized rotary knife working on one bone at a time, which recovers additional valuable meat in the form of small trimmings, but the cost of labor makes this technique applicable only to bones containing relatively large qualities of meat, and more important, even after trimming in this manner, the trimmed bones still contain substantial amounts of valuable meat.

Thus, the meat packer seeks to leave as little meat as possible on the bones, since the latter are worth very little, whereas the meat, if, in the form of small trimmings, is many times more valuable. An integrated meat packer is able to utilize meat trimmings in the preparation of many varieties of luncheon meats, bologna and wieners, since, for this purpose, the various ingredients must be ground or comminuted in any case.

An important consideration is that the meat recovered from the bones be in a raw state, rather than cooked. This is due to the fact that cooked meat possesses little or no "binding capacity", while raw meat possesses high "binding capacity". Binding capacity refers to the ability of the meat to form a stable mixture with added fat, water and salt, which is not broken down during the normal processing (cooking) operations in the manufacture of wieners, bologna, etc. Thus, the raw meat is considerably more valuable to the packer for this purpose than is cooked meat.

Some of the existing techniques for removing residual meat from bones are as follows:

(1) Enzymatic attack.

The meat-containing bones are subjected to the action of proteolytic enzymes which loosen the meat-to-bone bond at elevated temperatures. See Canadian Pat. No. 646,042 and U.S. Pat. No. 3,293,687. As discussed above, this method produces the removed meat in a cooked form.

(2) Puffing gun.

The bones are subjected to rather high steam pressures for a short time. Upon suddenly releasing this pressure, the meat is separated from the bone by the sudden liberation of heat. Again, the removed meat is in a cooked or partially cooked condition. See U.S. Pat. No. 3,129,455.

(3) Shot blasting.

In U.S. Pat. No. 3,089,775, bones are shot blasted with particles of ice or dry ice to remove the meat. The ice is then melted and drained off. (4) Mechanical methods. In this category there are a variety of approaches in which the bones are subjected to some form of mechanical contact to remove the residual meat in raw condition.

(a) In Canadian Pat. No. 711,844, bones are conveyed past rotary brushes.

(b) In Canadian Pat. No. 743,694, the bones are flailed with rotating chains.

(c) In Canadian Pat. No. 573,876, bones are conveyed repeatedly past a second conveyor containing meat-removing knives.

(d) In Canadian Pat. No. 698,939 and U.S. Pat. No. 3,112,203, water is added to crushed or comminuted bones, and the mass is violently agitated to free the meat from the bone particles and form a slurry containing both meat and bone. The mixture is centrifuged to remove the bone and then further centrifuged to dewater the meat tissue. The water fraction contains dissolved protein, and may be spray dried in order to recover this valuable protein.

(e) In U.S. Pat. No. 3,028,243, the process is similar in principle to (d) above, but the centrifugally separated meat product retains the added water, obviating the need for spray-drying.

(f) In U.S. Pat. No. 2,895,162, the residual meat is stripped from bones by passing through a hammermill like apparatus with flat knife-type hammers and slotted discharge plate.

(g) In U.S. Pat. No. 3,142,860, the residual meat is shredded from bones during passage through a platen having yieldable projections.

(h) In U.S. Pat. Nos. 3,266,542, 3,266,543 and 3,256,555, the residual meat is separated from bone particles during passage through a plurality of closely spaced cutting elements, or alternatively through opposed sets of cutting, scrapping and tearing elements.

(5) Tumbling method.

In U.S. Pat. No. 3,594,190, the bones containing raw meat are tumbled in a rotating drum in the presence of water or brine solution to abrade the meat from the bones by the combined action of the solution and of the bones falling and rubbing repeatedly upon themselves to form a meat slurry which is then drained off from the cleaned bones for use directly in sausage or the like manufacture where it inputs good binding power and adds food value. This method is illustrated in flow diagram form in FIG. 1.

SUMMARY OF THE INVENTION

An object of the present invention is to provide a process for removing residual meat from all raw bones from which the major portion of the meat has already been removed which is an improvement over the above described tumbling method and which avoids the complex procedures and apparatus of the other above mentioned prior art techniques.

Another object of the present invention is to provide an improved tumbling process for removing residual meat from whole raw bones from which the major portion of the meat has already been removed which is simple, efficient and economical and in which there is produced a raw meat pumpable slurry useable directly in sausage or the like emulsions containing increased protein concentrations and an increased percentage of essential amino acids. A further object of the present invention is to provide an improved process for removing residual meat from whole raw bones from which the major portion of the meat has already been removed to produce a raw meat pumpable slurry useable directly in sausage or the like emulsions having a reduced calcium level when compared to mechanical processed raw bones for residual meat removing.

A feature of the present invention is the provision of a process for removing residual meat from whole raw bones from which the major portion of the meat has already been removed comprising the steps of tumbling a fresh batch of the bones in a brine solution used in processing a previous batch of the bones for a predetermined period of time and below that temperature at which the residual meat is cooked to abrade the residual meat from the fresh batch of the bones by a combined action of the used brine solution and of the fresh batch of the bones falling and rubbing repeatedly upon themselves to form a raw meat slurry; removing the slurry from the tumbled fresh batch of the bones as an end product of the process; tumbling the previously tumbled fresh batch of the bones in a fresh brine solution for the predetermined period of time and below that temperature at which the residual meat is cooked to abrade any remaining portions of the residual meat from the previously tumbled fresh batch of the bones by the combined action; removing cleaned bones from the tumbled fresh brine solution; replacing the removed cleaned bones with a new batch of the bones; and repeating the above process steps.

BRIEF DESCRIPTION OF THE DRAWING

Above-mentioned and other features and objects of this invention will become more apparent by reference to the following description taken in conjunction with the accompanying drawing, in which:

FIG. 1 is a flow diagram of the tumbling process disclosed in U.S. Pat. No. 3,594,190; and FIG. 2 is a flow diagram of the process in accordance with the principles of the present invention.

DESCRIPTION OF THE PREFERRED EMBODIMENT

Referring to FIG. 1, the process for removing residual meat from whole raw bones from which the major portion of the meat has already been removed according to U.S. Pat. No. 3,594,190 includes tumbling bones containing raw meat in a brine solution for several hours until the bones are substantially clean and a raw meat slurry has been formed. The temperature in this process can be room temperature or below. At the end of the tumbling step, the slurry is drained off, strained, if necessary, to remove any small bones. After removing the slurry the cleaned bones may be given an additional rinse with water or a fresh brine solution after the bulk of the meat slurry has been drained out. The rinse water or brine solution is separated from the cleaned bones and this rinse water or brine solution is mixed with the slurry to provide the desired end product which may be pumped or otherwise conveyed to the sausage or the like making operation.

In contrast to the prior art process of FIG. 1, the process of the present invention as illustrated in flow diagram form in FIG. 2 includes the steps of tumbling a fresh batch of bones in a brine solution used in processing a previous batch of the bones for a predetermined period of time and below that temperature at which the residual meat is cooked to abrade the residual meat from the fresh batch of bones by a combined action of the used brine solution and of the fresh batch of bones falling and rubbing repeatedly on themselves to form a raw meat slurry. The resulting slurry is removed as an end product of the process and may be pumped or otherwise conveyed directly to the sausage or the like making operation. The remaining previously tumbled batch of bones are again tumbled in a fresh brine solution for a predetermined period of time and again below that temperature at which the residual meat is cooked to abrade any remaining portions of the residual meat from the bones by the above described combined action. The cleaned bones are then removed leaving the resulting brine solution. The removed cleaned bones are then replaced with a new batch of bones containing raw meat and the process steps are then repeated.

This process is a counter-current double extraction of raw meat from bones in which the fresh brine is used on the cleanest bones so that the slurry developed is not so thick that it clings to the discharged or removed bones. Also, the more viscous brine solution is used where there is the maximum recoverable meat on the bones. As a result of this double extraction process, the final protein concentration is approximately 6% by-weight.

The brine solution used has been found to provide optimum recovery at 6–10% by-weight of sodium chloride. The time of tumbling is no greater than one hour since little benefit is achieved in tumbling longer than one hour.

The device used in the tumbling steps is a rotary mixer that could be either a large cement type mixer with internal baffles or of the tumbler variety, such as a Langen tumbler.

It has been found that the double extraction process provides the best recovery of raw meat from the bones and provides a higher protein concentration in the raw meat slurry. When the Langen tumbler was employed it was rotated at a rate of approximately 4 revolutions per minute and when the cement-type mixer was employed, it was rotated at approximately 50 revolutions per minute.

The optimum process would be a continuous counter-current double extraction process. In this process, bones would be introduced into a rotating tunnel on the same side that the raw meat slurry is removed. The bones would pass through the tunnel with tumbling and exit under a spray of fresh brine being introduced into the tunnel. The rate of revolution of the tunnel would set the sojourn time of the system and fresh brine would be introduced at the same rate that the raw meat slurry was removed.

It has been found that the amino acid profile of the raw meat slurry product employing the process of the present invention is exceptionally good. The USDA requires that 33% of the amino acids be essential amino acids (isoleucine, leucine, lysine, methionine, phenylalanine, threonine and valine). It has been found that in the slurry produced by the process of the present invention, 37.8% of the amino acids are essential amino acids.

The calcium level in the raw meat slurry of mechanically processed bones has been found to be 0.75% by-weight while the calcium level of the raw meat slurry produced by the process of the present invention is no greater than 0.045% by-weight. The use of the slurry resulting from the process of the present invention in a sausage or the like emulsion will be limited by the additional moisture in the slurry. For this reason, a 6% protein slurry will be considerably more valuable than a 3% protein slurry. For example, in a bologna, one could use a 6% protein slurry as up to 34.8% of the emulsion with no added water. But with a 3% protein slurry, only 22.6% of the emulsion with no added water could be used. Water in such a product, would be 18% of the emulsion.

While I have described above the principles of my invention in connection with specific apparatus it is to be clearly understood that this description is made only by way of example and not as a limitation to the scope of my invention as set forth in the objects thereof and in the accompanying claims.

I claim:

1. A process for removing residual meat from whole raw bones from which the major portion of the meat has already been removed comprising the steps of:

tumbling a fresh batch of said bones in a brine solution used in processing a previous batch of said bones for a predetermined period of time and below that temperature at which said residual meat is cooked to abrade said residual meat from said fresh batch of said bones by a combined action of said used brine solution and of said fresh batch of said bones falling and rubbing repeatedly upon themselves to form a raw meat slurry;

removing said slurry from said tumbled fresh batch of said bones as an end product of said process;

tumbling said previously tumbled fresh batch of said bones in a fresh brine solution for said predetermined period of time and below that temperature at which said residual meat is cooked to abrade any remaining portions of said residual meat from said previously tumbled fresh batch of said bones by said combined action;

removing cleaned bones from said tumbled fresh brine solution;

replacing said removed cleaned bones with a new batch of said bones; and repeating the above process steps.

2. A process according to claim 1, wherein said brine solution includes 6 to 10 percent sodium by-weight.

3. A process according to claim 2, wherein said predetermined period of time is no greater than one hour.

4. A process according to claim 3, wherein said tumbling steps are performed by a tumbling device rotating at approximately 4 revolutions per minute.

5. A process according to claim 3, wherein said tumbling steps are performed by a tumbling device rotating at approximately 50 revolutions per minute.

6. A process according to claim 3, wherein said tumbling steps are performed by a tumbling device rotating at a rate of 4 to 50 revolutions per minute.

7. A process according to claim 1, wherein said predetermined period of time is no greater than one hour.

8. A process according to claim 7, wherein said tumbling steps are performed by a tumbling device rotating at approximately 4 revolutions per minute.

9. A process according to claim 7, wherein said tumbling steps are performed by a tumbling device rotating at approximately 50 revolutions per minute.

10. A process according to claim 7, wherein said tumbling steps are performed by a tumbling device rotating at a rate of 4 to 50 revolutions per minute.

11. A process according to claim 1, wherein said tumbling steps are performed by a tumbling device rotating at approximately 4 revolutions per minute.

12. A process according to claim 1, wherein said tumbling steps are performed by a device rotating at approximately 50 revolutions per minute.

13. A process according to claim 1, wherein said tumbling steps are performed by a tumbling device rotating at a rate of 4 to 50 revolutions per minute.

14. A process according to claim 1, wherein said end product has a protein concentration of approximately 6 percent by-weight.

15. A process according to claim 1, wherein said end product has an amino acid profile where approximately 37.8% of said amino acids are essential amino acids.

16. A process according to claim 1, wherein said end product has a calcium level no greater than 0.045 percent by-weight.

* * * * *